(12) United States Patent
Owen

(10) Patent No.: US 9,151,411 B2
(45) Date of Patent: Oct. 6, 2015

(54) MOUNTABLE CABLE TIE WITH FINE ADJUSTMENT AND METHOD OF USE THEREOF

(71) Applicant: Thomas Dale Owen, Braselton, GA (US)

(72) Inventor: Thomas Dale Owen, Braselton, GA (US)

(*) Notice: Subject to any disclaimer, the term of this patent is extended or adjusted under 35 U.S.C. 154(b) by 0 days.

(21) Appl. No.: 14/628,950

(22) Filed: Feb. 23, 2015

(65) Prior Publication Data

US 2015/0167866 A1 Jun. 18, 2015

Related U.S. Application Data

(63) Continuation of application No. 13/628,470, filed on Sep. 27, 2012, now Pat. No. 9,021,681.

(51) Int. Cl.
| | |
|---|---|
| *B23P 11/00* | (2006.01) |
| *B65D 63/00* | (2006.01) |
| *H02G 3/32* | (2006.01) |
| *F16L 3/233* | (2006.01) |
| *B65D 63/10* | (2006.01) |
| *F16L 3/137* | (2006.01) |

(52) U.S. Cl.
CPC ............ *F16L 3/137* (2013.01); *B65D 63/1027* (2013.01); *B65D 63/1063* (2013.01); *F16L 3/2334* (2013.01); *H02G 3/32* (2013.01); *Y10T 29/4995* (2015.01); *Y10T 29/49959* (2015.01)

(58) Field of Classification Search
CPC .......... B65D 63/1018; B65D 63/1063; B65D 63/1072; B65D 63/1081; B65D 63/1027; B65D 2563/103; B65D 2563/106; B65D 2563/107; B65D 2563/108; B65D 2563/101; F16L 3/2332; F16L 3/2334; F16L 3/2336; Y10T 24/14; Y10T 24/141; Y10T 24/1498; Y10T 29/49948; Y10T 29/49966
USPC ........ 24/16 PB, 17 A, 17 AP, 19, 163 R, 169, 24/170, 176, 178, 596.1, 30.5 P, 614, 24/DIG. 47, DIG. 48; 29/525.01, 525.13
See application file for complete search history.

(56) References Cited

U.S. PATENT DOCUMENTS

| | | | | | |
|---|---|---|---|---|---|
| 3,054,585 | A | * | 9/1962 | Roberts et al. | 248/74.3 |
| 3,102,311 | A | * | 9/1963 | Martin et al. | 24/16 PB |
| 3,605,199 | A | * | 9/1971 | Eberhardt | 24/16 PB |
| 3,766,608 | A | * | 10/1973 | Fay | 24/16 PB |
| 3,886,630 | A | * | 6/1975 | Emery | 24/16 PB |
| 3,983,603 | A | * | 10/1976 | Joyce | 24/16 PB |
| 4,045,843 | A | * | 9/1977 | Loose et al. | 24/16 PB |
| 4,272,047 | A | * | 6/1981 | Botka | 248/74.3 |
| 4,557,455 | A | * | 12/1985 | Benjamin | 248/496 |
| 4,788,751 | A | * | 12/1988 | Shely et al. | 24/16 PB |
| 4,805,856 | A | * | 2/1989 | Nicoli et al. | 248/74.3 |

(Continued)

*Primary Examiner* — Essama Omgba
(74) *Attorney, Agent, or Firm* — Mathew L. Grell; Balser & Grell IP Law

(57) ABSTRACT

A mountable cable tie with fine adjustment with an elongated strap having a first strap end and a second strap end, the elongated strap having one or more rows of teeth or cross-bars formed crosswise on the elongated strap, and a plurality of holes positioned linear along the median between the one or more rows of teeth, at least one locking buckle positioned proximate the second strap end, the at least one locking buckle having at least one channel and at least one locking tang or pawl positioned within the locking buckle, wherein increased insertion of the first strap end into the locking head decreases the size of the loop of the elongated strap to secure the bundle.

23 Claims, 14 Drawing Sheets

(56) References Cited

U.S. PATENT DOCUMENTS

| | | | |
|---|---|---|---|
| 4,866,816 A * | 9/1989 | Caveney | 24/16 PB |
| 4,897,899 A * | 2/1990 | Shely et al. | 24/16 PB |
| 5,031,943 A * | 7/1991 | Scott et al. | 292/307 R |
| 5,193,254 A * | 3/1993 | Geisinger | 24/484 |
| 5,398,383 A * | 3/1995 | Bingold | 24/16 PB |
| 5,836,053 A * | 11/1998 | Davignon et al. | 24/16 PB |
| 5,884,367 A * | 3/1999 | Teagno et al. | 24/16 PB |
| 5,890,265 A * | 4/1999 | Christian et al. | 24/16 PB |
| D419,861 S * | 2/2000 | Khokhar | D8/396 |
| 6,076,234 A * | 6/2000 | Khokhar et al. | 24/16 PB |
| 6,149,109 A * | 11/2000 | Stankowski | 24/16 PB |
| 6,185,791 B1 * | 2/2001 | Khokhar | 24/16 PB |
| 6,185,792 B1 * | 2/2001 | Nelson et al. | 24/16 PB |
| 6,226,839 B1 * | 5/2001 | Sayegh | 24/16 PB |
| 6,938,305 B2 * | 9/2005 | Garver | 24/16 PB |
| 7,100,248 B2 * | 9/2006 | Crook | 24/16 PB |
| 7,131,168 B2 * | 11/2006 | Pangallo | 24/16 PB |
| 7,730,592 B2 * | 6/2010 | Krisel | 24/16 PB |
| 8,683,659 B2 * | 4/2014 | Cheng | 24/16 PB |
| 8,683,665 B2 * | 4/2014 | Fraze | 24/593.11 |
| 8,763,209 B2 * | 7/2014 | Kavarsky et al. | 24/68 SK |
| 9,021,681 B2 * | 5/2015 | Owen | 29/525.01 |
| 2003/0070263 A1 * | 4/2003 | Mohnke | 24/16 PB |
| 2004/0154139 A1 * | 8/2004 | Crook | 24/16 PB |
| 2007/0205335 A1 * | 9/2007 | Huebner et al. | 248/58 |
| 2008/0083094 A1 * | 4/2008 | Hsu et al. | 24/16 PB |
| 2014/0082923 A1 * | 3/2014 | Owen | 29/525.03 |

* cited by examiner

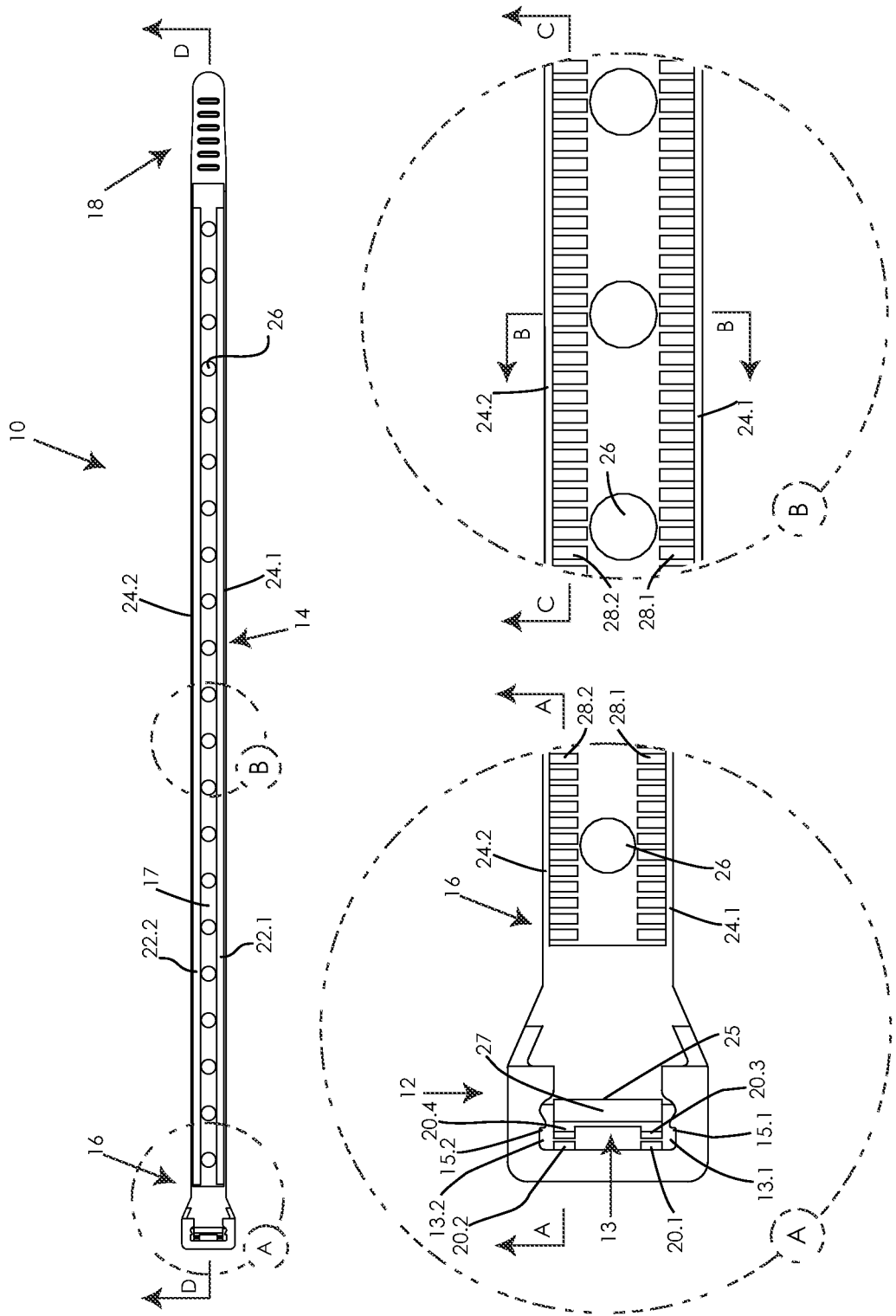
FIG. 1.1

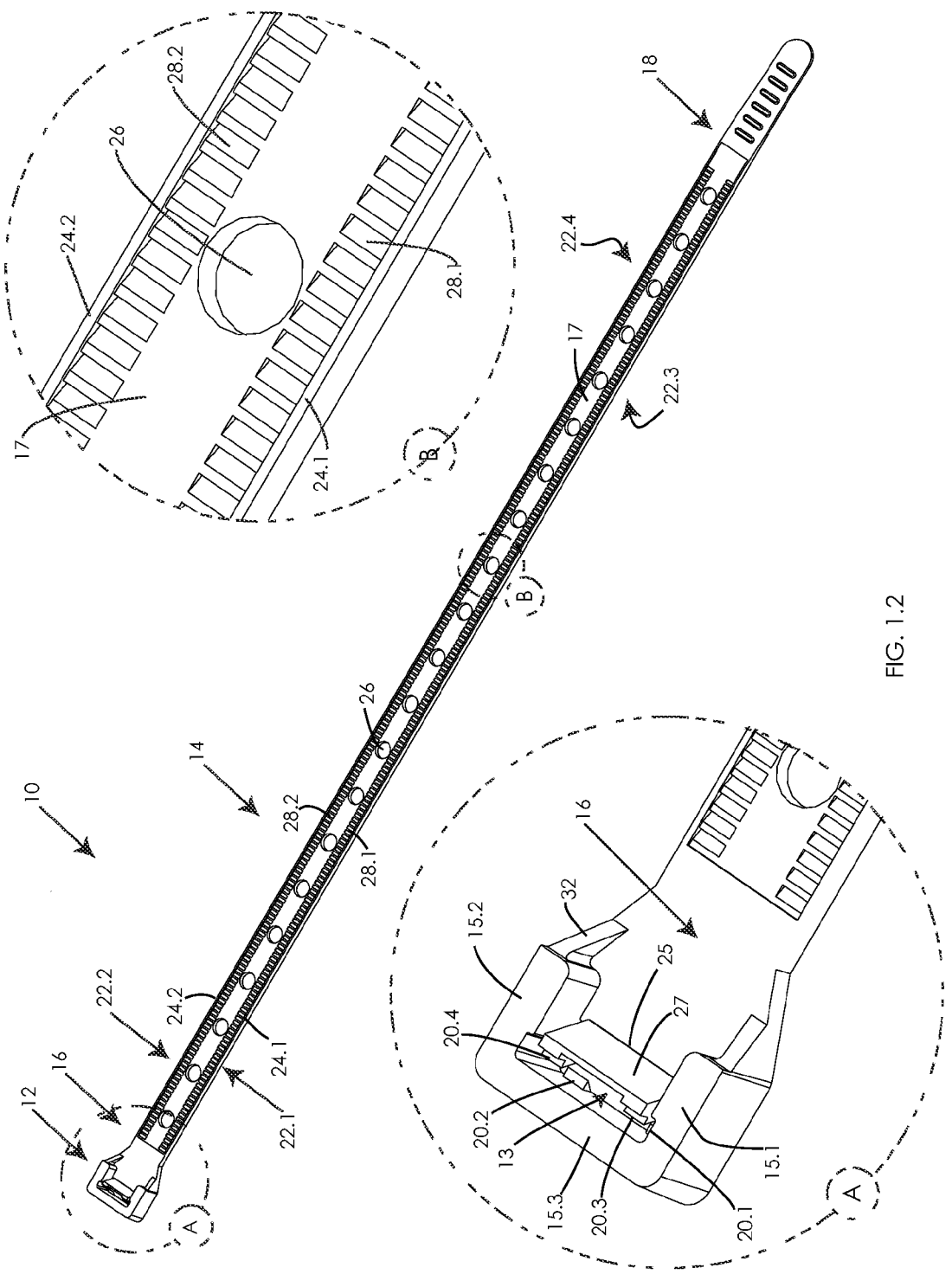
FIG. 1.2

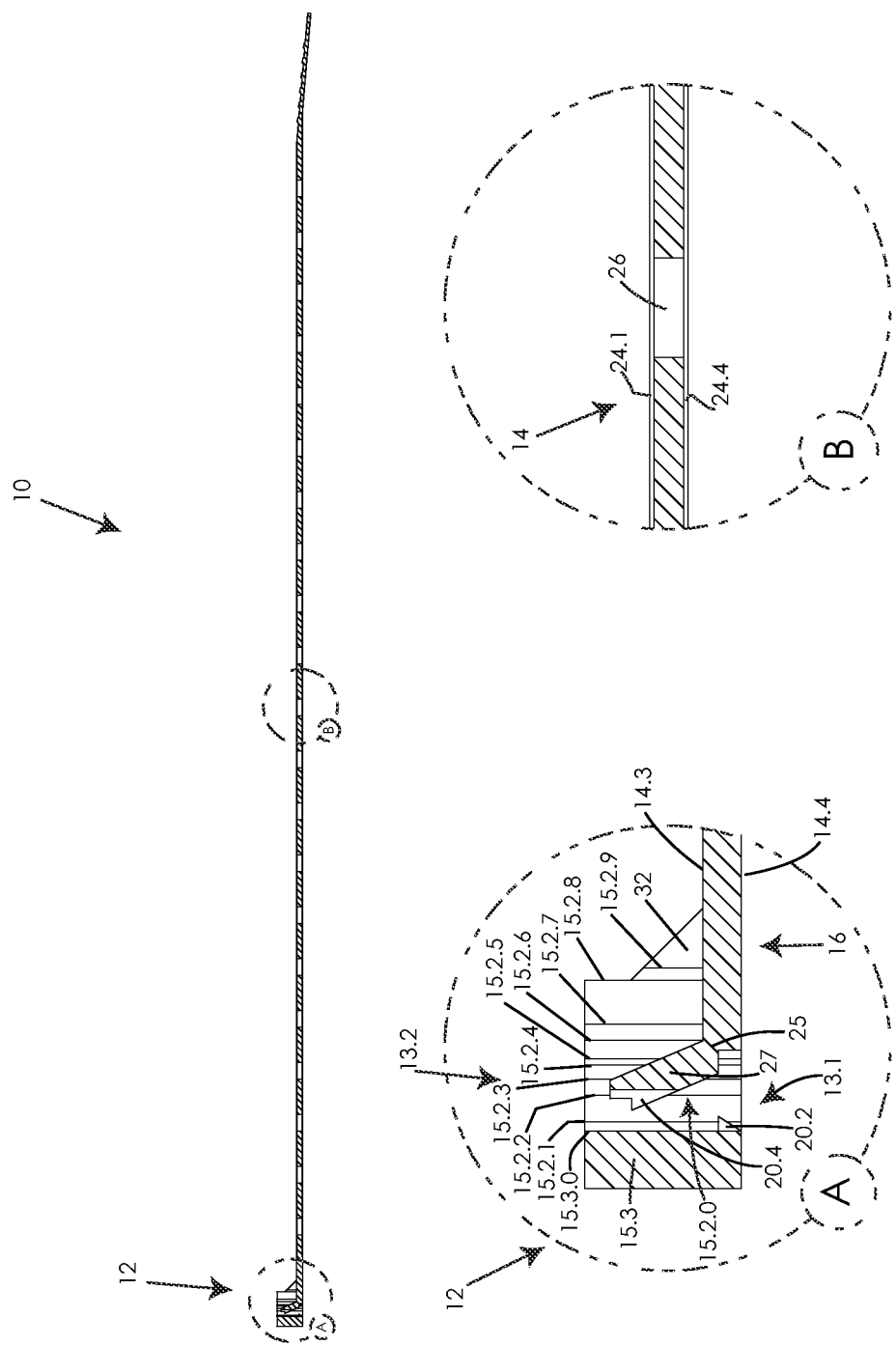

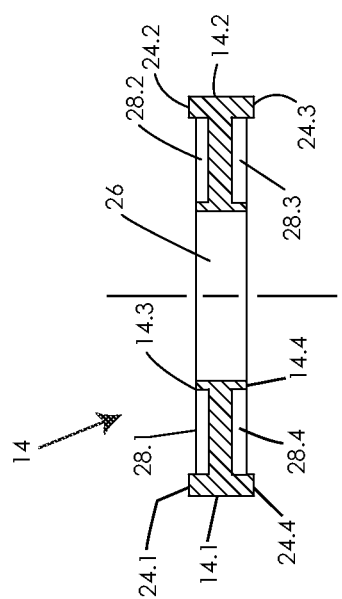
SECTION BB
FIG. 4.1

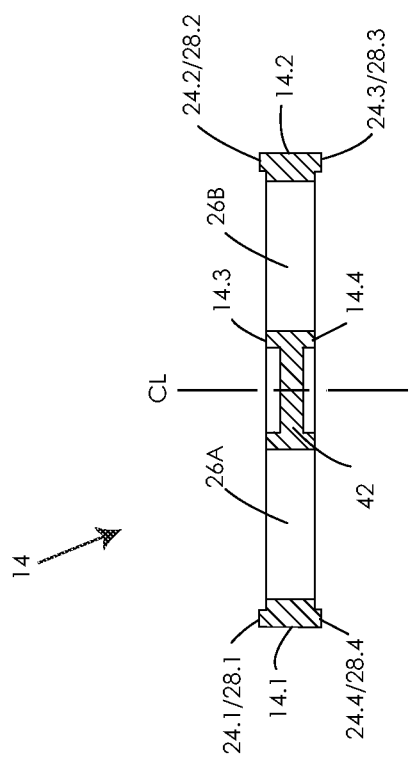
FIG. 4.2

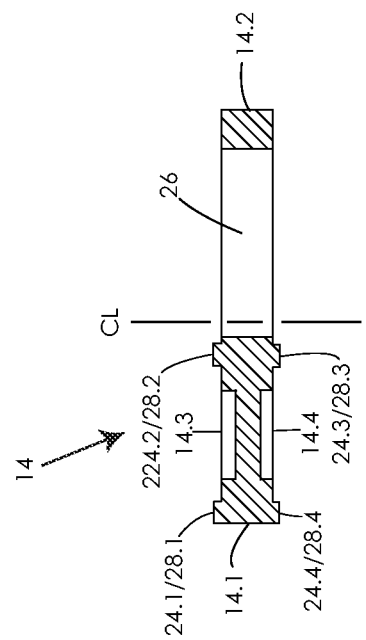
FIG. 4.3

SECTION CC

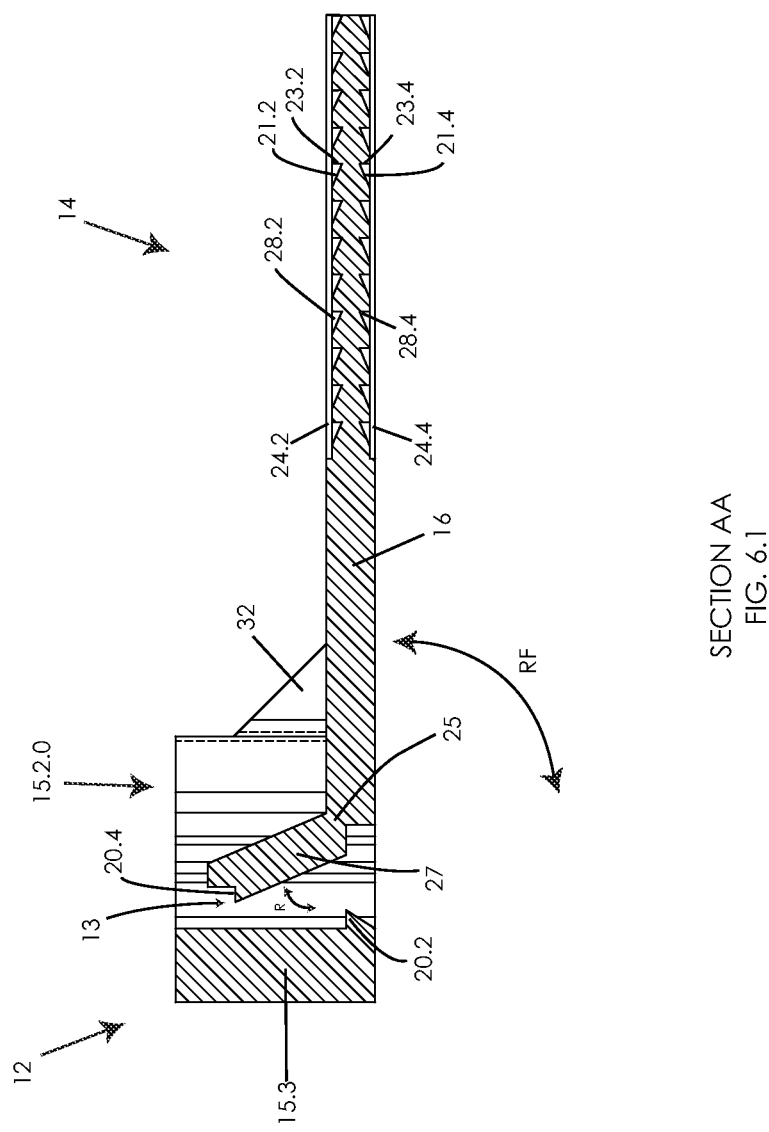
SECTION AA
FIG. 6.1

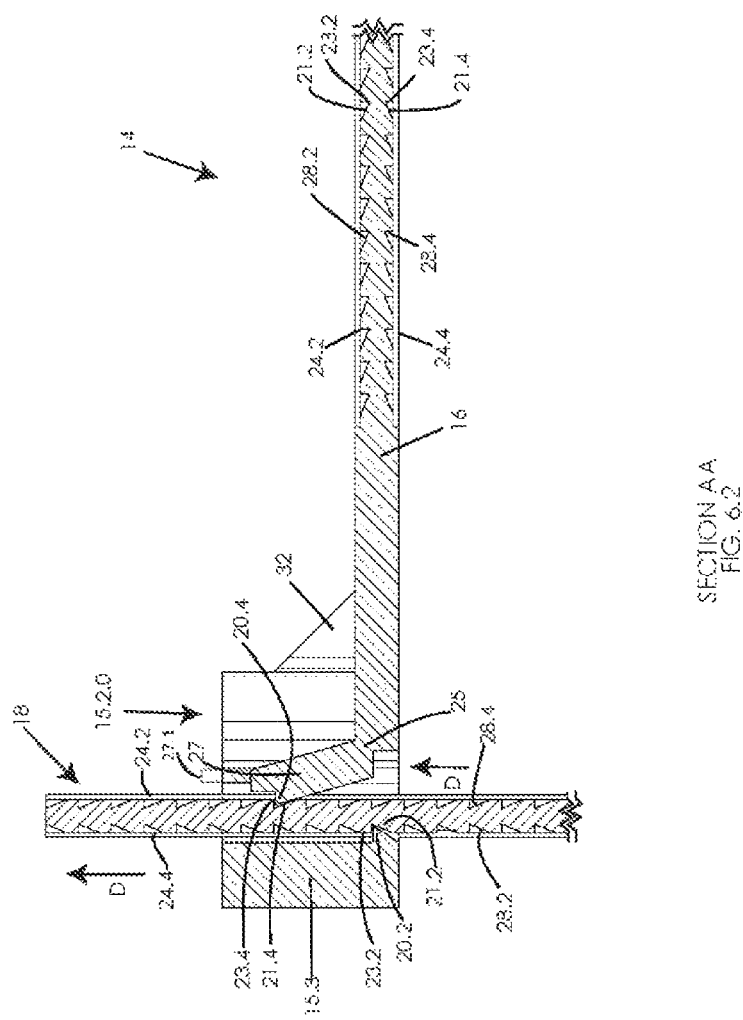

MOUNTABLE CABLE TIE WITH FINE ADJUSTMENT AND METHOD OF USE THEREOF

CROSS-REFERENCE TO RELATED APPLICATIONS

To the full extent permitted by law, the present United States Non-provisional Patent Application, is a Continuation of, and hereby claims priority to and the full benefit of United States Non-provisional Application entitled "Mountable Cable Tie with Fine Adjustment and Method of Use Thereof," having assigned Ser. No. 13/628,470, filed on Sep. 27, 2012, and issued under U.S. Pat. No. 9,021,681 on May 5, 2015, incorporated herein by reference in its entirety.

TECHNICAL FIELD

The disclosure generally relates to bundling ties, more specifically, it is related to a cable tie with a strap having a plurality of holes to anchor or fasten the tie.

BACKGROUND

A variety of supporting cable ties, straps and clamps, are well known in the art and are used in a variety of applications, such as securing a bundle of cables, wires, or hydraulic tubing. Known cable ties of conventional construction are elongate members having a flexible longitudinal strap having a head at one end and a tail at the other end. The strap is wrapped around bundles of wires or hydraulic tubing and the tail is inserted through a passageway in the head. The head of the cable tie typically includes a locking element which engages with the strap so that when the tail is pulled through the passageway in the head, the locking element secures against transverse teeth running the width of the strap.

Other known cable ties are ties having a longitudinal strap with a plurality of longitudinally spaced apertures, holes, or rungs utilized to secure a bundle of cables or wires or hydraulic tubing by wrapping the strap around the bundle and securing one or more spaced apertures or holes to a hook or branch positioned on one end of the strap. One problem with this style of cable tie is it lacks the ability for small increments of adjustment to tighten and secure the several different sizes of bundles of wires or hydraulic tubing due to its fixed spacing between holes.

Still other known cable ties are ties having an elongated strap and a head with a mounting hole affixed thereto or made integral to the head. The mounting hole is utilized to secure the cable tie and its bundle of wires or hydraulic tubing to a mounting surface. One problem with this style of cable tie is the mounting mechanism (hole) is positioned near the head which limits accessibility to work the elongated strap into the head to tighten the strap around the bundle of wires or hydraulic tubing.

Therefore, it is readily apparent that there is a recognizable unmet need for a mountable cable tie with fine adjustment and method of use thereof that functions to provide a cable tie with a plurality of mounting holes to choose from without limiting accessibility to work the strap into the head and to tighten the strap around the bundle, and a flexible longitudinal strap with a plurality of teeth or cross-bars formed on the strap to provide small increments of adjustment to tighten the strap.

SUMMARY

Briefly described, in an example embodiment, the present apparatus and method overcomes the above-mentioned disadvantages and meets the recognized need for a mountable cable tie with fine adjustment and method of use thereof comprising, in general, an elongated strap having a first strap end and a second strap end, the elongated strap having one or more rows of teeth or cross-bars formed crosswise on the elongated strap, and a plurality of holes positioned linear along the median between the one or more rows of teeth, at least one locking buckle positioned proximate the second strap end, the at least one locking buckle having at least one channel and at least one locking tang or pawl positioned within the locking buckle, wherein increased insertion of the first strap end into the locking head decreases the size of the loop of the elongated strap to secure the bundle.

In use, a fastener such as a screw, nail or clip is positioned within one of the plurality holes running linear along the elongated strap to secure the elongated strap to a surface while leaving a section of the elongated strap and the locking buckle free to provide accessibility to work the first strap end into the locking buckle. The elongated strap is pulled through the at least one locking buckle, wherein the at least one locking tang or pawl of the at least one channel engages the one or more rows of teeth or cross-bars formed on the elongated strap. Moreover, increased insertion of first strap end into the locking buckle decreases the size of the loop and the strap teeth lock in the locking buckle securing the bundle in the cable tie to the surface.

According to its major aspects and broadly stated, the present apparatus meets the recognized need for a mountable cable tie with fine adjustment and method of use thereof including a strap having a first strap end and a second strap end, the strap having one or more rows of teeth or cross-bars formed crosswise on the elongated strap and running proximately from the first strap end to the second strap end, and a plurality of holes positioned linear along the elongated strap adjacent the one or more rows of teeth, a locking buckle positioned proximate the second strap end, the locking buckle having one or more channels and one or more locking tang or pawl positioned within the locking buckle, wherein increased insertion of the first strap end into the locking head decreases the size of the loop of the elongated strap to secure the bundle.

In an exemplary embodiment, a mountable cable tie with fine adjustment and method of use includes a cable tie, to bundle one or more elongated members and to affix the bundled members to an object, the cable tie comprising a strap configured with a first strap end and a second strap end, the strap configured with one or more rows of cross-bars extended along the length thereof, the strap configured with one or more longitudinally spaced aperture therethrough, wherein the aperture is positioned proximate the cross-bars, a locking buckle positioned proximate the second strap end, the locking buckle configured with a channel therethrough, the channel configured with one or more pawl positioned side-by-side therein to confront individually associated ones of the rows of cross-bars of the first strap end.

In a further exemplary embodiment, a method of bundling one or more elongated members to a hole in an object comprising the steps of providing a cable tie comprising a strap configured with a first strap end and a second strap end, the strap configured with one or more rows of cross-bars extended along the length thereof, the strap configured with one or more longitudinally spaced aperture therethrough, wherein the aperture is positioned proximate the cross-bars, a locking buckle positioned proximate the second strap end, the locking buckle configured with a channel therethrough, the channel configured with one or more pawl positioned side-by-side therein to confront individually associated ones of the rows of cross-bars of the first strap end, encircling the one or more elongated members with the first strap end around, inserting the first strap end therein the channel of the locking buckle, pulling the first strap end through the channel, and ratcheting the one or more rows of cross-bars formed on the strap across the one or more pawl to secure the elongated members together in a bundle.

Accordingly, a feature of the a mountable cable tie with fine adjustment and method of use thereof is its ability to provide a cable tie with a plurality of mounting holes to choose from without limiting the accessibility to work the strap end into the head when fastening around a group or bundle of objects.

Another feature of the mountable cable tie with fine adjustment and method of use thereof is its ability to provide a flexible longitudinal strap with one or more rows of a plurality of teeth or cross-bars formed on the strap to provide small increments of adjustment to tighten the strap.

Yet another feature of the mountable cable tie with fine adjustment and method of use thereof is its ability to provide a cable tie with the mounting mechanism (hole) positioned away from the head which increases accessibility to work the elongated strap into the head to tighten the strap around the bundle of wires or hydraulic tubing.

Yet another feature of the mountable cable tie with fine adjustment and method of use thereof is its ability to provide a means of hanging or fastening a group of objects bundled by the cable tie while using less material in the manufacture of the cable tie.

Yet another feature of the mountable cable tie with fine adjustment and method of use thereof is its ability to provide a cable tie with one or more parallel rows of a plurality of teeth or cross-bars formed crosswise on the elongated strap.

Yet another feature of the mountable cable tie with fine adjustment and method of use thereof is its ability to provide two rows of teeth leaving the center section of the flexible longitudinal strap open to position the plurality of mounting mechanisms, such as holes.

Yet another feature of the mountable cable tie with fine adjustment and method of use thereof is its ability to provide a locking buckle having one or more channels and each channel having a locking tang or pawl positioned within the channel to accommodate the one or more rows of teeth of the flexible longitudinal strap, and thus providing finite adjustment and extra bundling power.

Yet another feature of the mountable cable tie with fine adjustment and method of use thereof is its ability to provide a new and improved cable tie.

Yet another feature of the mountable cable tie with fine adjustment and method of use thereof is its ability to provide a plurality of mounting mechanisms integrated in the cable tie to secure a cable to a mounting surface.

Yet another feature of the mountable cable tie with fine adjustment and method of use thereof is its ability to provide a cable tie to bind a bundle of wires or cables and the like.

Yet another feature of the mountable cable tie with fine adjustment and method of use thereof is its ability to provide ease of handling for sufficiently fastening or mounting the cable tie and bundle of wires cinched in the cable tie.

These and other features of the mountable cable tie with fine adjustment and method of use thereof will become more apparent to one skilled in the art from the following Brief Description of the Drawings, Detailed Description, and Claims when read in light of the accompanying Detailed Drawings.

BRIEF DESCRIPTION OF THE DRAWINGS

The present mountable cable tie with fine adjustment and method of use thereof or the like will be better understood by reading the Detailed Description of the embodiments with reference to the accompanying drawings, in which like reference to numerals denote similar structures and refer to like elements throughout, and in which:

FIG. 1.1 is a top view of the exemplary mountable cable tie with fine adjustment;

FIG. 1.2 is a perspective view of the exemplary mountable cable tie with fine adjustment;

FIG. 3 is a cross sectional view of the cable tie of FIG. 1, shown along cross section line D-D;

FIG. 4.1, 4.2, 4.3 is a cross sectional view of the cable tie of FIG. 1, shown along cross section line B-B;

FIGS. 6.1 and 6.2 is a cross sectional view of the cable tie of FIG. 1, shown along cross section line A-A;

Figure 2:
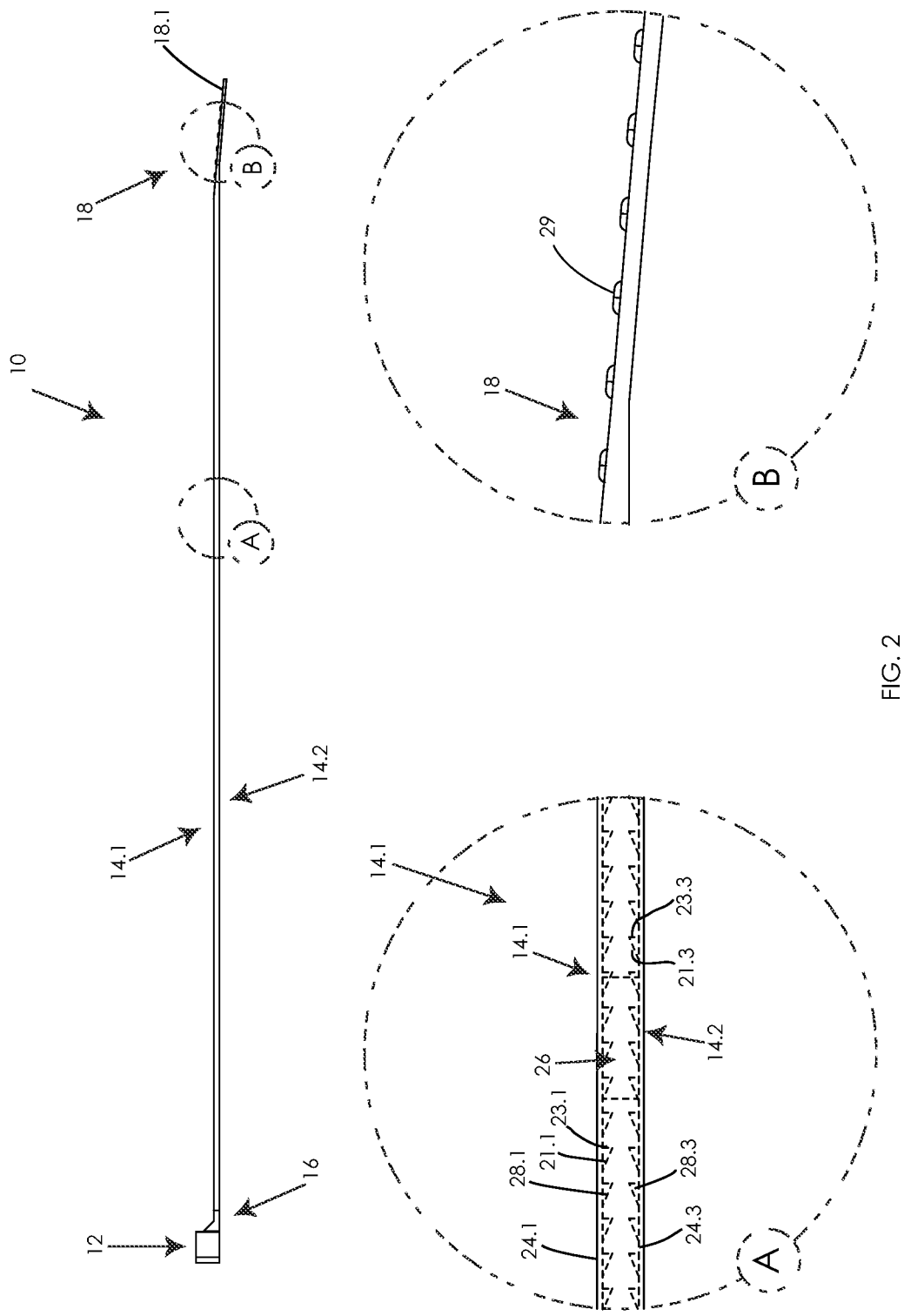
FIG. 2 is a side view of the cable tie of FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1.1, 1.2, 2, 3, 4.1, 4.2, 4.3, 5, 6.1, 6.2, 7, 8, 9, 10 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1.1 and 1.2 by way of example, and not limitation, there is illustrated an example embodiment tie or wrap, such as cable tie 10. Preferably, cable tie 10 includes an elongated belt, band or strip, such as strap 14 and a clasp, clip, catch or fastener, such as locking buckle 12. Preferably strap 14 includes first strap end 18 and second strap end 16. Strap 14 preferably includes one or more rows 22, such as first row 22.1 and second row 22.2 having a plurality of teeth, divots, rungs, cut outs, angled notches, recessed teeth, bumps, raised segments, angled riser, angled catch, such as cross-bars 28 formed or positioned on strap 14 from proximately first strap end 18 to proximately second strap end 16 and separated by a flush or lowered median strip, such as first surface 17.

It is contemplated herein that one or more spaced and/or parallel rows 22 of cross-bars 28 enables center, right, or left justified first surface 17 of strap 14 to be open and/or available to position the plurality of mounting mechanisms, such as aperture 26. It is contemplated herein that cross-bars 28 may be positioned along the full length or a partial length of strap 14. It is contemplated herein that cross-bars 28 may be formed on a top strap side, such as first cross-bars 28.1 and/or second cross-bars 28.2 in parallel along strap 14, or may be formed on more than one side (a top strap side and an underside strap side), such as first cross-bars 28.3 and second cross-bars 28.4, or all sides of strap 14. Preferably, cross-bars 28 are positioned crosswise, at ninety degrees (90) or may be positioned at an acute angle relative to the center axis D of strap 14. It is further contemplated herein that cross-bars 28 provide strap 14 of cable tie 10 with one or more rows of a plurality of teeth or cross-bars 28 formed on strap 14 to provide small increments of adjustment to tighten strap 14. It is further contemplated herein that one or more rails 24, such as first rail 24.1 and second rail 24.2 may be formed on strap 14 or formed as elevated rails positioned on strap 14 from proximately first strap end 18 to proximately second strap end 16 with cross-bars 28 positioned thereon or may be utilized as guide rails to guide strap 14 through locking buckle 12. Furthermore, strap 14 preferably includes a plurality of spaced holes, orifice, mounting holes, or slits, such as aperture 26 positioned longitudinally along strap 14 adjacent the one or more rows of teeth, such as first row 22.1 and second row 22.2, on strap 14 from proximately first end 18 to proximately second strap end 16. It is contemplated herein that aperture 26 is preferably round, however; other configurations are contemplated herein to accommodate a variety of attachment or hanging mechanism of cable tie 10. It is contemplated herein that aperture 26 provides cable tie 10 with a plurality of mounting holes to choose from without limiting the accessibility to work first end 18 into locking buckle 12 when fastening strap 14 around a group or bundle of objects. It is contemplated herein that aperture 26 provides cable tie 10 with the mounting mechanism (hole), such as aperture 26, positioned a distance from locking buckle 12 which increases accessibility to work strap 14 into locking buckle 12 to tighten strap 14 around the bundled members, such as wires, hydraulic tubing, or the like (elongated members EM). Moreover, since aperture 26 is not positioned approximate locking buckle 12, locking buckle 12 preferably has increased accessibility to work strap 14 into locking buckle 12. It is further contemplated herein that apertures 26 preferably provide for fine adjustment to secure cable tie 10.

Preferably, locking buckle 12 is positioned on one end of strap 14, such as second strap end 16 and the other end, such as first strap end 18 of strap 14 forms the tail end of strap 14. Locking buckle 12 preferably includes one or more slot, channel or central passage therethrough, such as channel 13 preferably configured to slidably fit or guide strap 14 therethrough and arranged preferably ninety degrees (90) or proximately perpendicular to strap 14, or proximately parallel to strap 14, or otherwise to enable strap 14 to bend or curl and to feed strap 14 therein channel 13 of locking buckle 12. Moreover, channel 13 may be configured to include straight, right angled, angled, or contoured side walls 15, such as first side wall 15.1 and second side wall 15.2 and third side wall 15.3 configured to accommodate and guide strap 14 in and through locking buckle 12. More specifically, side walls 15 of channel 13 may be configured to accommodate and guide one or more rails 24, such as first rail 24.1 and second rail 24.2. Furthermore, opposing side walls 15, such as first side wall 15.1 and second side wall 15.2 and third side wall 15.3 and tongue 27 preferably form channel 13 of locking buckle 12 to accommodate and guide strap 14 in and through locking buckle 12. It is contemplated herein that side wall 15.1, side wall 15.2, and side wall 15.3 may be configured with straight, right angled, angled, rounded or contoured transitions, corners or segments or the like to accommodate and guide strap 14 in and through channel 13 of locking buckle 12.

Preferably, channel 13 further includes one or more latch, lever, locking tang, such as pawl 20 preferably positioned adjacent channel 13 of locking buckle 12, which preferably engages, confronts, or ratchets over associated ones of cross-bars 28 to lock strap 14 into locking buckle after it is coiled around a bundle of articles (elongated members EM). It is contemplated herein that channel 13 is preferably configured to accommodate insertion and passage therethrough of strap 14, one or more rows 22, and/or one or more elevated rails 24. Moreover, locking buckle 12 preferably includes one or more sets of opposing pawls 20, such as first pawl 20.1 and third pawl 20.3 and/or second pawl 20.2 and fourth pawl 20.4 or side-by-side pawls 20, such as first pawl 20.1 and second pawl 20.2 and/or third pawl 20.3 and fourth pawl 20.4. Preferably, third pawl 20.3 and fourth pawl 20.4 are formed on a bar or lever, such as tongue 27 which is preferably connected to second strap end 16 or locking buckle 12 by a pivot member or spring member, such as hinge 25. Moreover, hinge 25 and tongue 27 are preferably configured to enable third pawl 20.3 and fourth pawl 20.4 to ratchet on and off or over cross-bars 28 as strap 14 is pulled through locking buckle 12. Preferably, first pawl 20.1 and second pawl 20.2 are formed on side wall 15.3 opposite tongue 27. In use, first pawl 20.1 of locking buckle 12 preferably engages first row 22.1 of first cross-bars 28.1 of strap 14 and second pawl 20.2 preferably engage second row 22.2 of second cross-bars 28.2 when strap 14 is pulled through channel 13 of locking buckle 12 and each pawl ratchets over its individually associated one cross-bar. Moreover, third pawl 20.3 of locking buckle 12 preferably engages third row 22.3 of first cross-bars 28.3 of strap 14 and fourth pawl 20.4 preferably engage fourth row 22.4 of fourth cross-bars 28.4 when strap 14 is pulled through channel 13 of locking buckle 12.

It is contemplated herein that strap 14 may include a complimentary underside wherein strap 14, includes one or more rows 22, such as third row 22.3 and fourth row 22.4, plurality of cross-bars 28, such as third cross-bars 28.3 and fourth cross-bars 28.4, and one or more elevated rails 24, such as third rail 24.3 and fourth rail 24.4. In use, channel 13 may be configured to include first side wall 15.1 and second side wall 15.2 configured to accommodate one or more rails 24, such as third rail 24.3 and fourth rail 24.4 to guide strap 14 through locking buckle 12. Moreover, third pawl 20.3 of locking buckle 12 preferably engages third row 22.3 of third cross-bars 28.3 of strap 14 and fourth pawl 20.4 preferably engages fourth row 22.4 of fourth cross-bars 28.4 when strap 14 is pulled through channel 13 of locking buckle 12. It is contemplated herein that ratchet mechanical action of cable tie 10 is preferably enabled when strap 14 is pulled through channel 13 of locking buckle 12, wherein cross-bars 28 of strap 14 are drawn through locking buckle 12 and pulled across pawl(s) 20.

It is contemplated herein that locking buckle 12 and strap 14 may be configured having one or more sets of channels 13, pawls 20, tongue 27, hinge 25, cross-bars 28, rows 22, and/or rails 24.

It is further contemplated herein that complimentary interaction of multiple pawls 20 and cross-bars 28 configurations set forth above increases the holding power of cable tie 10 between locking buckle 12 and strap 14 and/or enables fine adjustment between locking buckle 12 and strap 14.

It is further contemplated herein that cable tie 10 is preferably configured with locking buckle 12 at one end and strap 14 extending therefrom.

It is still further contemplated herein that strap 14 and locking buckle 12 may be an integrated or formed as a unit or part or may be formed separately and assembled together for use.

Strap 14 and locking buckle 12 are preferably formed, molded or configured from a suitable material, such as nylon, polypropylene, polyethylene, polystyrene, polyurethane, neoprene, or alternative resin or thermoplastic, plastic, cardboard, rubber, fiber, fiber reinforced, synthetic rubber, natural rubber, wood, metal, aluminum, alloy, stainless steel, shape memory metal, or any semi-flexible material or the like and any manufacturing method, capable of configuring or providing the structure of strap 14 and locking buckle 12. Preferably, the material includes other suitable characteristics, such as flexibility, strength, rigidity, durability, water-resistance, light weight, pliability, wearability, chemical inertness, oxidation resistance, safety, ease of workability, longevity, or other beneficial characteristic understood by one skilled in the art.

It is contemplated herein that strap 14 and locking buckle 12, one or more sets of channels 13, pawls 20, tongue 27, hinge 25, cross-bars 28, rows 22, and/or rails 24 may be formed in a variety of shapes other than flat and square, such as triangle, rectangular or polygon.

Referring now to FIG. 2 by way of example, and not limitation, there is illustrated an example embodiment side view of cable tie 10. Preferably, strap 14 includes one or more rails 24, such as first rail 24.1 and third rail 24.3 to guide strap 14 through locking buckle 12. Preferably, cross-bars 28 may be formed on one or more sides 14.0 of strap 14, such as first side 14.1, second side 14.2, third side 14.3, and fourth side 14.4; wherein cross-bars 28.1 and cross-bars 28.2 are positioned on third side 14.1; and wherein cross-bars 28.3 and cross-bars 28.4 are positioned on third side 14.2. Moreover, cross-bars 28 may be configured having a triangular or ramp side view or other configuration known to one of ordinary skill in the art, such as cross-bars 28.1 may include first angled, ramped or slanted surface, such as pawl riser 21, and more specifically first pawl riser 21.1 and cross-bars 28.1 may include latch, ledge or pawl catch 23, and more specifically first pawl catch 23.1. Likewise, cross-bars 28.3 may include first pawl riser 21.3 and first pawl catch 23.3. In use, cross-bars 28.1 of strap 14 preferably engages first pawl 20.1 of locking buckle 12 and cross-bars 28.3 of strap 14 preferably engages third pawl 20.3 of locking buckle 12 when strap 14 is pulled through channel 13 of locking buckle 12, as shown in FIG. 1.

Referring again to FIGS. 1.1, 1.2 and 2, preferably first row 22.1 and second row 22.2 of first cross-bars 28.1 and second cross-bars 28.2 of strap 14 preferably engages first pawl 20.1 and second pawl 20.2 of locking buckle 12 as strap 14 is pulled through locking buckle 12 where first pawl 20.1 and second pawl 20.2 ratchet, confront, spring, push, or lift first cross-bars 28.1 and second cross-bars 28.2, respectively.

For example, first pawl 20.1 of locking buckle 12 preferably first engages first riser 21.1 of first cross-bar 28.1 and then ratchets over first pawl catch 23.1 of first cross-bar 28.1 where first pawl 20.1 locks against first pawl catch 23.1 to secure strap 14 therein locking buckle 12 and first pawl 20.1 of locking buckle 12; and so on for each of cross-bars 28 and each pawl 20, and on each edge of strap 14, such as first side 14.1 and second side 14.2, as strap 14 is pulled through channel 13 of locking buckle 12.

Likewise mirrored on the adjacent underside of strap 14 there preferably is third row 22.3 and fourth row 22.4 of third cross-bars 28.3 and fourth cross-bars 28.4 of strap 14 preferably engages third pawl 20.3 and fourth pawl 20.4 as strap 14 is pulled through locking buckle 12 where third pawl 20.3 and fourth pawl 20.4 ratchet, confront, spring, push, or lift third cross-bars 28.3 and fourth cross-bars 28.4, respectively.

For example, third pawl 20.3 of locking buckle 12 preferably first engages first riser 21.3 of first cross-bar 28.3 and then ratchets over first pawl catch 23.3 of third cross-bar 28.3 where third pawl 20.3 locks against first pawl catch 23.3 to secure strap 14 therein locking buckle 12 and third pawl 20.3 of locking buckle 12; and so on for each of cross-bars 28 and each pawl 20, and on each edge of strap 14, such as first side 14.1 and second side 14.2, as strap 14 is pulled through channel 13 of locking buckle 12.

It is contemplated herein that such functionality set forth above may be configured on all sides of strap 14 to secure strap 14 therein locking buckle 12.

Referring again to FIG. 2, first strap end 18 preferably includes strap end 18.1 and one or more raised ridges 29 configured crosswise on first side 14.1 of strap 14 to facilitate gripping and pulling of strap end 18. It is contemplated herein that one or more raised ridges 29 may be formed on both or either side first side 14.1 and/or second side 14.2 of strap 14. Preferably, raised ridges 29 enable a user to grip first strap end 18 between index finger and thumb to assist with inserting first strap end 18 into locking buckle 12 as well as pulling first strap end 18 through locking buckle 12.

Referring to FIG. 3 by way of example, and not limitation, there is illustrated an example cross section embodiment of locking buckle 12 and strap 14 of cable tie 10. Preferably, locking buckle 12 includes channel 13 formed from opposing side walls 15, such as first side wall 15.1 and second side wall 15.2 and third side wall 15.3 and tongue 27. Channel 13 preferably includes opening or entrance, such as first opening 13.1 and exit, such as second opening 13.2 to enable entrance and exit of strap 14 therethrough channel 13. Moreover, side wall 15.2, like matching side wall 15.1, shown in FIG. 1 includes internal wall surface 15.2.0 configured to accommodate and guide strap 14 in and through locking buckle 12. Preferably, internal wall surface 15.2.0 of side wall 15.2 includes vertical lines 15.2.1-15.2.9, which represents the side view of the straight, right angled, angled, rounded or contoured transitions, corners, edges or segments of internal wall surface 15.2.0, as shown in FIG. 1. It is contemplated herein that internal wall surface 15.2.0 of side wall 15.2 and likewise for similar internal wall surface 15.1.0 and internal wall surface 15.3.0 of side wall 15.1 and side wall 15.3, respectively, may be configured with straight, right angled, angled, rounded or contoured transitions, corners, edges, segments, or the like to accommodate, mirror, match, and guide strap 14 in first opening 13.1 of channel 13 and through second opening 13.2 of channel 13 of locking buckle 12. It is further contemplated herein that internal wall surface 15.2.0 of side wall 15.2 and likewise for similar internal wall surfaces 15.1.0 and 15.3.0 of side wall 15.1 and side wall 15.3, respectively, may be configured to mirror or match one or more sides of strap 14, such as second side 14.2, first side 14.1, and third side 14.3, respectively, of strap 14.

Preferably, locking buckle 12 further includes transition support, between locking buckle 12 and second strap end 16 of strap 14, such as support 32. Support 32 is preferably configured to reduce the flex or bend between locking buckle 12 and second strap end 16 of strap 14, to maintain locking buckle 12 and second strap end 16 of strap at a fixed position or angle therebetween, and/or to stabilize locking buckle 12 when pulling strap 14 there through locking buckle 12.

Moreover, locking buckle 12 preferably includes hinge 25 positioned proximate second strap end 16, first opening 13.1 of channel 13, opposite pawl 20.2, between tongue 27 and second strap end 16 or proximate side wall 15.1 or side wall 15.2, or may be anywhere therein channel 13 of locking buckle 12. Moreover, hinge 25 preferably provides hinge movement, spring torsion, rotational flexibility, or ratchet movement, such as radial movement R for tongue 27. Such radial movement R of tongue 27 preferably enables the ratchet of pawls 20 over cross-bars 28 of strap 14 when strap 14 is pulled through locking buckle 12.

Referring to FIG. 4.1, 4.2, 4.3 by way of example, and not limitation, there is illustrated an example cross section embodiment of strap 14 of cable tie 10. Preferably, strap 14 includes first side 14.1, second side 14.2, third side 14.3, and fourth side 14.4. Moreover, strap 14 includes one or more rails 24, such as first rail 24.1, second rail 24.2, third rail 24.3, and fourth rail 24.4 preferably utilized to guide, mate, mirror and/or slidably pass strap 14 through locking buckle 12 and to protect the one or more cross-bars 28 formed on one side or more than one side, such as first cross-bars 28.1, second cross-bars 28.2, third cross-bars 28.3, and fourth cross-bars 28.4. Furthermore, one or more cross-bars 28 are preferably positioned adjacent one or more rails 24 on strap 14.

Referring to FIG. 4.1 by way of example, and not limitation, there is illustrated an example cross section embodiment of strap 14 of cable tie 10. Preferably, aperture 26 is positioned proximate center line CL along strap 14, such as aperture 26 approximately centered between one or more cross-bars 28 and/or one or more rails 24.

Referring to FIG. 4.2 by way of example, and not limitation, there is illustrated an example cross section embodiment of strap 14 of cable tie 10. Preferably, one or more apertures 26, such as apertures 26A and apertures 26B are positioned proximate one or more cross-bars 28 and/or one or more rails 24 with a center spacer or bar, such as, divider 42 therebetween apertures 26A and apertures 26B.

Referring to FIG. 4.3 by way of example, and not limitation, there is illustrated an example cross section embodiment of strap 14 of cable tie 10. Preferably, aperture 26 is positioned to one side or off set to one side from center line CL along strap 14 and one or more cross-bars 28 and/or one or more rails 24 are positioned to the other side or off set to the other side from center line CL.

It is contemplated herein that other possible configurations of strap 14 and the positioning of one or more apertures 26, one or more cross-bars 28, and/or one or more rails 24 of strap 14 are included herein.

Figure 5:
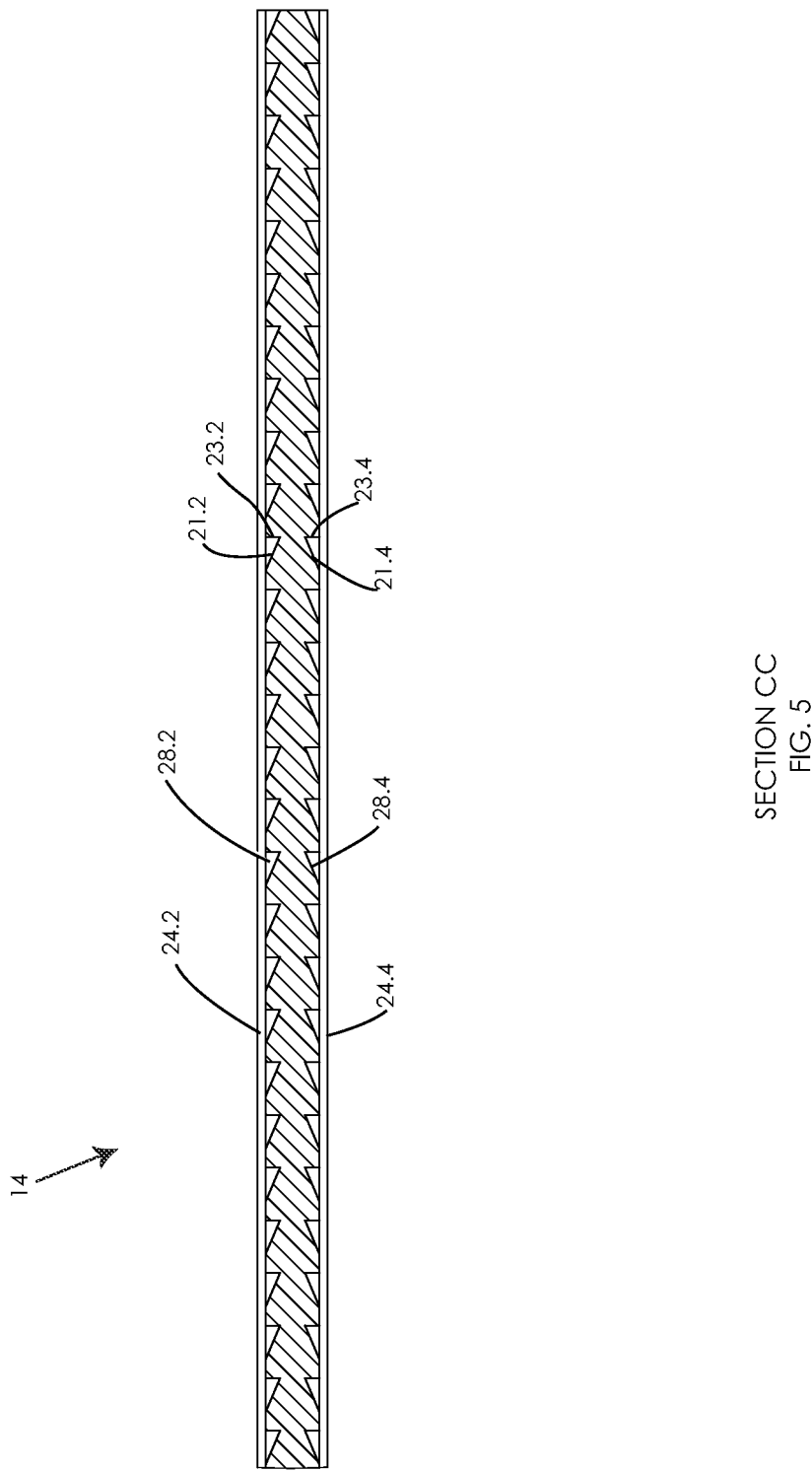
FIG. 5 is a cross sectional view of the cable tie of FIG. 1, shown along cross section line C-C.

Referring to FIG. 5 by way of example, and not limitation, there is illustrated an example cross section embodiment of strap 14 of cable tie 10. Preferably, strap 14 includes one or more rails 24, such as second rail 24.2 and fourth rail 24.4 preferably utilized to guide strap 14 through locking buckle 12 and to protect the one or more cross-bars 28 formed on one side or more than one side of strap 14, such as second cross-bars 28.2 and fourth cross-bars 28.4. Furthermore, one or more cross-bars 28, such as second cross-bars 28.2 includes second riser 21.2 of second cross-bar 28.2 and second pawl catch 23.2 of second cross bar 28.2 and fourth cross-bars 28.4 includes fourth riser 21.4 of fourth cross-bar 28.4 and fourth pawl catch 23.4 of fourth cross-bar 28.4. Referring again to FIG. 3 and FIG. 5 by way of example, and not limitation, riser 21 and pawl catch 23 are configured to operate in conjunction with pawl 20 of locking buckle 12. For example, for each cross-bar and pawl 20, pawl 20 of locking buckle 12 preferably first engages riser 21 of cross-bar 28 and then ratchets over pawl catch 23 of cross-bar 28 where pawl 20 locks against pawl catch 23 to secure strap 14 therein locking buckle 12. Pawl 20 preferably prevents removal of strap 14 being pulled through locking buckle 12 when pawl 20 locks against pawl catch 23 to secure strap 14 therein locking buckle 12.

It is contemplated herein that other engagement or securing configurations of locking buckle 12, channel 13, pawls 20, strap 14, two or more rows of cross-bar 28, two or more apertures 26 are included herein. Moreover, cable tie 10 herein may also have a conventional release mechanism (not shown) provided in locking buckle 12 configured to enable pawls 20 to be disengaged from cross-bars 28 formed on strap 14, to allow strap 14 and first strap end 18 to be loosened or removed from locking buckle 12. Moreover, cable tie herein may also have a plurality of rungs disposed on the strap which engage with a worm gear mechanism (not shown), disposed within or on locking buckle 12 of the cable tie. Alternatively, cable tie herein may have a strap with a plurality of beads integrally formed along the strap, which engage with a tapered slot or pawl formed in locking buckle 12. As is apparent, the concept of the cable tie herein is utilizable with any and all types of cable ties.

Referring to FIG. 6.1 by way of example, and not limitation, there is illustrated an example cross section embodiment of locking buckle 12 and strap 14 of cable tie 10. Preferably, locking buckle 12 includes channel 13 positioned proximately perpendicular to second strap end 16 and formed from opposing side walls 15, such as second side wall 15.2, third side wall 15.3, and tongue 27. Moreover, locking buckle 12 preferably includes hinge 25 positioned proximate second strap end 16, between tongue 27 and second strap end 16 or side wall surface 15.2.0, or anywhere therein channel 13 of locking buckle 12. Moreover, hinge 25 preferably provides hinge movement, spring torsion, rotational flexibility, or ratchet movement, such as radial movement R for tongue 27. Such radial movement R of tongue preferably enables the engage and ratchet of pawl 20 over cross-bar 28 of strap 14 when strap 14 is pulled through locking buckle 12.

Preferably, strap 14 includes one or more rails 24, such as second rail 24.2 and fourth rail 24.4 preferably utilized to guide strap 14 through locking buckle 12 and to protect the one or more cross-bars 28 formed on one side or more than one side of strap 14, such as second cross-bars 28.2 and fourth cross-bars 28.4. Furthermore, one or more cross-bars 28, such as second cross-bars 28.2 includes second riser 21.2 of second cross-bar 28.2 and second pawl catch 23.2 of second cross-bar 28.2 and fourth cross-bars 28.4 includes fourth riser 21.4 of fourth cross-bar 28.4 and fourth pawl catch 23.4 of fourth cross-bar 28.4.

Referring to FIG. 6.2 by way of example, and not limitation, there is illustrated an example cross section embodiment of locking buckle 12 and strap 14 of cable tie with strap 14 inserted therein channel 13 of locking buckle 12. As strap 14 is pulled through channel 13 (see FIG. 6.1) of locking buckle 12 in direction D second pawl 20.2 of locking buckle 12 preferably first engages second riser 21.2 of second cross-bar 28.2 and then ratchets over second pawl catch 23.2 of second cross-bar 28.2 where second pawl 20.2 locks against second pawl catch 23.2 to secure strap 14 therein locking buckle 12 and fourth pawl 20.4 of locking buckle 12 preferably first engages fourth pawl riser 21.4 of fourth cross-bar 28.4 and then ratchets over fourth pawl catch 23.4 of fourth pawl 20.4 where fourth pawl 20.4 locks against fourth pawl catch 23.4 ("ratchet action") and so on for each pair of cross-bars 28 of strap 14 as strap 14 in direction D, and similar ratchet action may occur on each edge or side of strap 14, as strap 14 is pulled through channel 13 of locking buckle 12.

Moreover, tongue 27 may have lever 27.1 positioned on one end of tongue 27 and configured as a release mechanism to enable pivot of tongue 27 and third pawl 20.3 and fourth pawl 20.4 about hinge 25 away and off of cross-bars 28 to enable strap 14 or first strap end 18 to be pulled back through locking buckle 12. In use, lever 27.1 preferably extends above locking buckle 12 to enable a user of cable tie 10 to get a finger or finger nail on lever 27.1 to release or pivot of tongue 27 and third pawl 20.3 and fourth pawl 20.4 about hinge 25 away and off of cross-bars 28 to enable strap 14 or first strap end 18 to be pulled back through locking buckle 12. It is contemplated herein that other release mechanisms, such as lever 27.1, known to one of ordinary skill in the art may be utilized to release strap 14 from locking buckle 12.

Moreover, locking buckle 12 preferably includes one or more sets of opposing pawls 20, such as first pawl 20.1 and third pawl 20.3 and/or second pawl 20.2 and fourth pawl 20.4 or side-by-side pawls 20, such as first pawl 20.1 and second pawl 20.2 and/or third pawl 20.3 and fourth pawl 20.4. Preferably, third pawl 20.3 and fourth pawl 20.4 are formed on a bar or lever, such as tongue 27 which is preferably connected to second strap end 16 or locking buckle 12 by a pivot member or spring member, such as hinge 25. Moreover, hinge 25 and tongue 27 are preferably configured to enable third pawl 20.3 and fourth pawl 20.4 to ratchet on and off or over cross-bars 28 as strap 14 is pulled through locking buckle 12.

Figure 7:
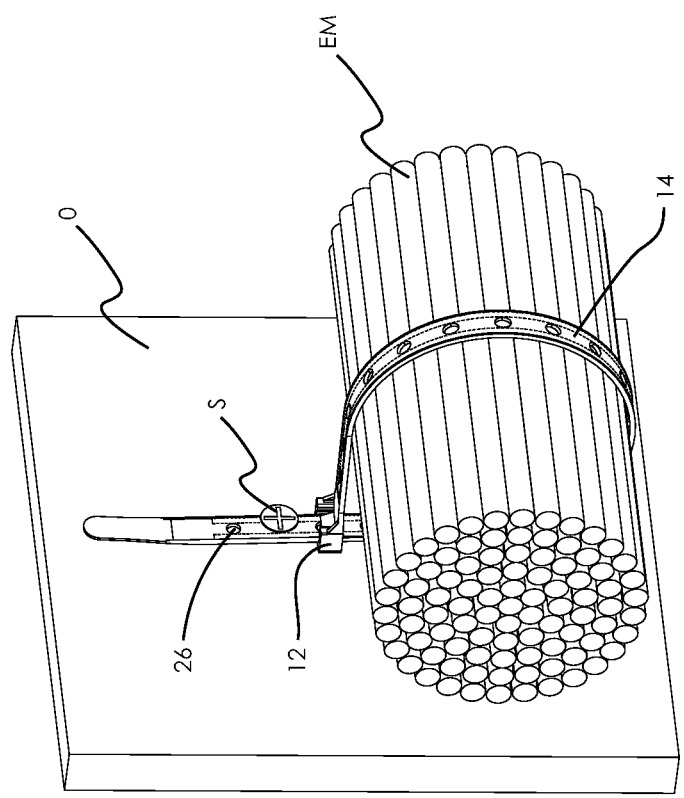
FIG. 7 is a perspective side view of the cable tie of FIG. 1, shown anchored to an object to secure one or more elongated member(s) along a run of the elongated member(s)

Referring to FIG. 7 by way of example, and not limitation, there is illustrated an example embodiment of cable tie 10 shown in use anchored to an object O to secure one or more elongated member(s) EM along a run of the elongated member(s). Preferably, first strap end 18 of strap 14 is preferably utilized to surround, encircle, cinch, wrap around or bundle one or more cable, rope, channel, hose, wires, or any other linear apparatus or the like, such as elongated member(s) EM. Moreover, strap 14 is preferably inserted in locking buckle 12 and pulled through channel 13 of locking buckle 12, wherein pawl 20 of locking buckle 12 engages cross-bars 28 formed on strap 14 to secure elongated member(s) EM together in a bundle and anchor elongated member(s) EM to object O. One or more aperture 26 in strap 14 may be aligned proximate hole H in object O and furthermore a screw, nail, or rivet, such as attachment mechanism S may be affixed to object O, or more specifically attachment mechanism S may be secured by driving or rotating attachment mechanism S therein hole H in object O to secure one or more elongated member(s) EM to object O.

It is contemplated herein that two or more cable tie 10 may be utilized herein, such as, first cable tie 10 may be utilized to secure one section of elongated member(s) EM and second cable tie 10 may be utilized to secure a second section of elongated member(s) EM to support a run or length of elongated member(s) EM.

Figure 8:
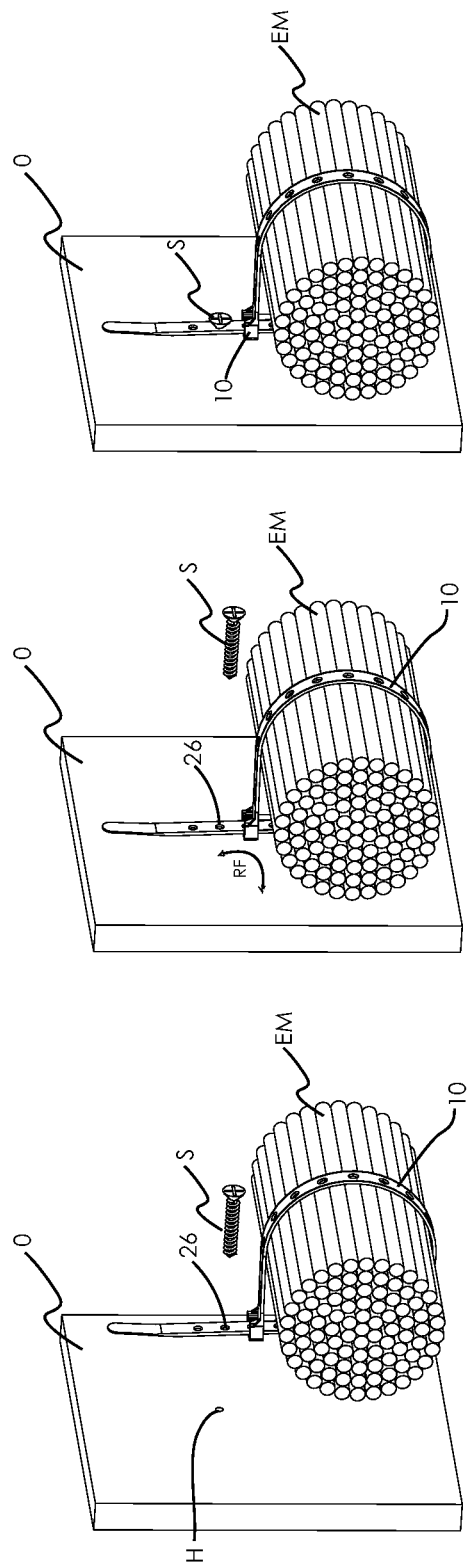
FIG. 8 is a perspective side view of the cable tie of FIG. 1, showing the steps or procedure to anchor or secure one or more elongated member(s) along a run of the elongated member(s) to an object.

Referring to FIG. 8 by way of example, and not limitation, there is illustrated an example embodiment of cable tie 10 showing the steps or procedure to anchor or secure one or more elongated member(s) EM along a run of the one or more elongated member(s) EM to an object O. Preferably, one or more elongated member(s) EM may be secured or bundled by cable tie 10. One or more aperture 26 in strap 14 may be aligned proximate hole H in object O and furthermore a screw, nail, or rivet, such as attachment mechanism S may be affixed to object O, or more specifically attachment mechanism S may be secured by driving or rotating attachment mechanism S therein hole H in object O to secure one or more elongated member(s) EM to object O.

Figure 9:
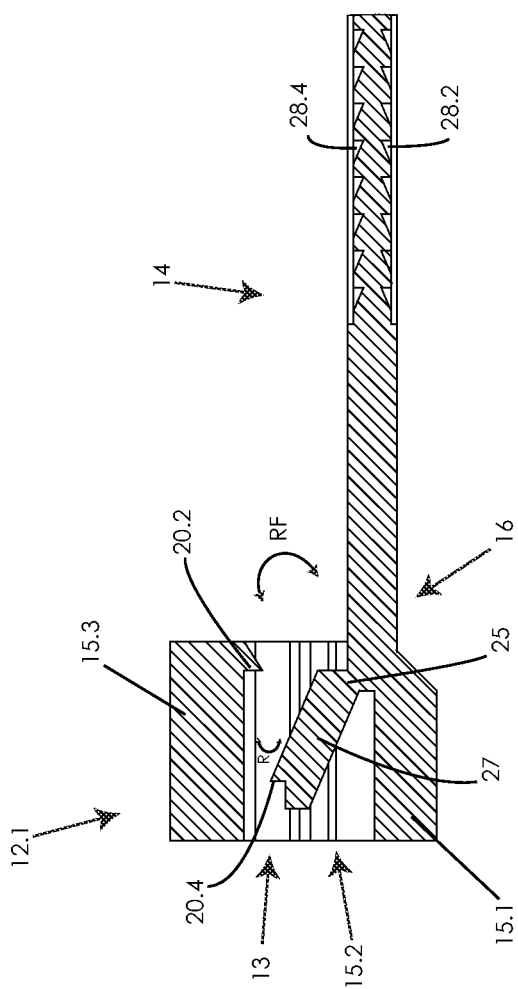
FIG. 9 is a cross sectional view of an alternate parallel channel embodiment cable tie of FIG. 1, shown along cross section line A-A.

Referring to FIG. 9 by way of example, and not limitation, there is illustrated an example cross section embodiment of an alternate locking buckle 12.1 and strap 14 of cable tie 10. Preferably, locking buckle 12.1 includes channel 13 positioned proximately in-line or parallel to second strap end 16 and formed from opposing side walls 15, such as first side wall 15.1, second side wall 15.2, third side wall 15.3, and tongue 27. Moreover, locking buckle 12.1 preferably includes hinge 25 positioned proximate second strap end 16, between tongue 27 and second strap end 16 or side wall surface 15.1, or anywhere therein channel of locking buckle 12.1. Moreover, hinge 25 preferably provides hinge movement, spring torsion, rotational flexibility, or ratchet movement, such as radial movement R for tongue 27. Such radial movement R of tongue 27 preferably enables the engage and ratchet function of pawl over cross-bars 28, specifically cross-bars 28.2 and cross-bars 28.4, of strap 14 when strap 14 is pulled through channel 13 of locking buckle 12.1. Alternate locking buckle 12.1 may be utilized to anchor or secure one or more elongated member(s) EM along a run of the one or more elongated member(s) EM to an object O, such as in FIG. 8. Alternate locking buckle 12.1 is preferably utilized to reduce the rotational force RF between second strap end 16 and alternate locking buckle 12.1, and more specifically the rotational force RF between second strap end 16 and alternate locking buckle 12.1 when anchoring or securing one or more elongated member(s) EM to an object O, such as in FIG. 8. Rotational force RF increases with the increased weight of one or more elongated member(s) EM.

It is contemplated herein that strap 14 may be trimmed flush with locking buckle 12/12.1 once anchored in hole H.

Figure 10:
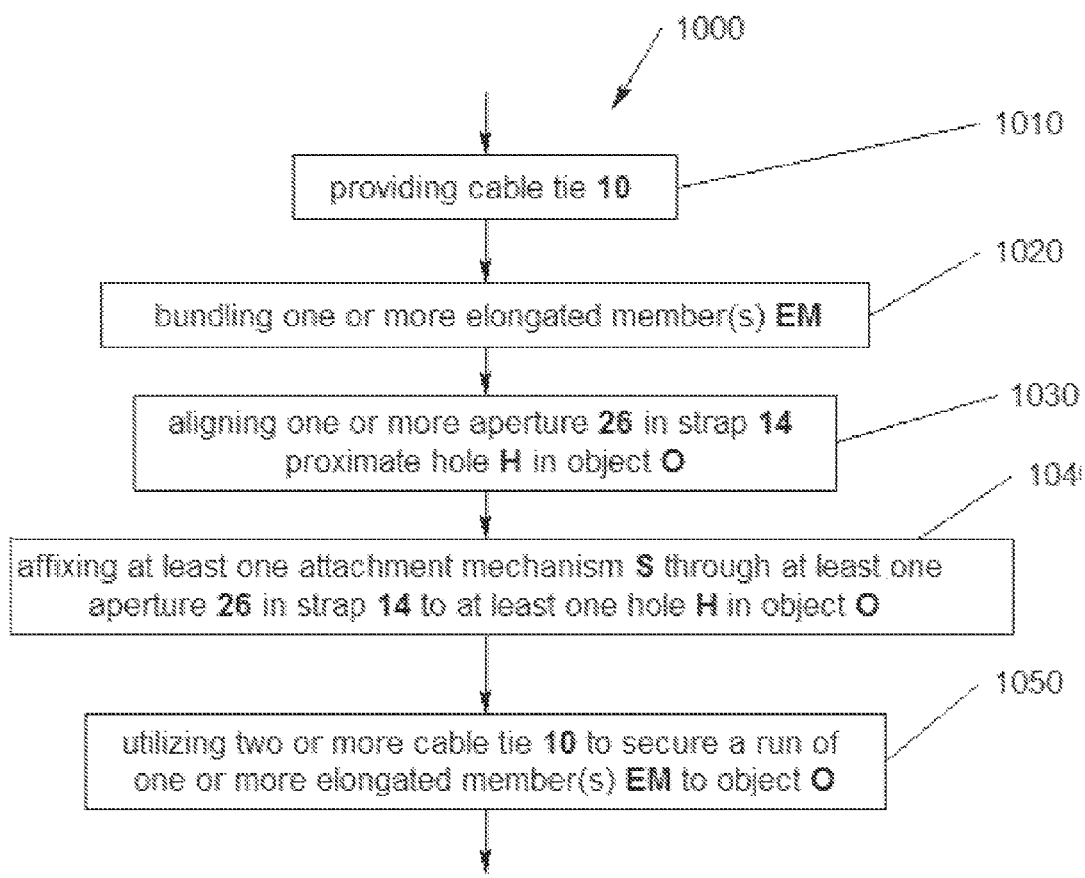
FIG. 10 is a flow diagram of a method of securing an cable tie combination of FIGS. 1-9 and bundle of elongated members to a hole in an object.

Referring now to FIG. 10, there is illustrated a flow diagram 1000 a method of securing one or more elongated member(s) EM to object O and/or a method of securing cable tie 10 to hole H in object O. In block or step 1010, providing cable tie 10 as described above in FIGS. 1-9. In block or step 1020, first strap end 18 of strap 14 is preferably utilized to surround, encircle, cinch, wrap around or bundle one or more cable, rope, channel, hose, wires, or any other linear apparatus or the like, such as elongated member(s) EM. Moreover, strap 14 is preferably inserted in locking buckle 12 and pulled through channel 13 of locking buckle 12, wherein pawl 20 of locking buckle 12 engages cross-bars 28 formed on strap 14 to secure elongated member(s) EM together in a bundle, as shown in FIG. 7.

In block or step 1030, one or more aperture 26 in strap 14 may be aligned proximate hole H in object O. In block or step 1040, a screw, nail, or rivet, such as at least one attachment mechanism S may be inserted through one or more aperture 26 in strap 14 and affixed to at least one hole H in object O, or more specifically attachment mechanism S may be secured by driving or rotating attachment mechanism S therein hole H in object O to secure strap 14 of cable tie 10 and one or more elongated member(s) EM to object O, as shown in FIG. 8.

In block or step 1050, two or more cable tie 10 may be utilized to secure a run of one or more elongated member(s) EM to object O, such as, first cable tie 10 may be utilized to secure one section of elongated member(s) EM and one or more other cable tie 10 may be utilized to secure one or more other sections of elongated member(s) EM to support a run or length of elongated member(s) EM.

The foregoing description and drawings comprise illustrative embodiments. Having thus described exemplary embodiments, it should be noted by those ordinarily skilled in the art that the disclosures within are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one ordinarily skilled in the art to which this disclosure pertains, having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

Therefore, at least the following is claimed:

1. A cable tie, to affix one or more elongated members to an object, the cable tie comprising:
   a strap configured with a first strap end and a second strap end and a top side and an underside, said strap configured with a plurality of cross-bars extended in two parallel spaced rows along each of said top side and said underside of said strap, said strap configured with one or more longitudinally spaced apertures therethrough, wherein said apertures are positioned between said two parallel rows of said plurality of cross-bars;
   a locking buckle positioned proximate said second strap end, said locking buckle is further configured to be approximately perpendicular to said second strap end, said locking buckle configured with a channel therethrough, wherein said channel is formed approximately parallel to said second strap end, said channel configured with two stationary pawls positioned therein to confront individually associated pairs of said plurality of cross-bars extended in two parallel spaced rows along said top side of said strap; and
   a tongue hingedly extended from said second strap end, said tongue configured with two ratchetable pawls facing said channel and opposing said stationary pawls, said two ratchetable pawls to confront individually associated pairs of said plurality of cross-bars extended in two parallel spaced rows along said underside.

2. The cable tie of claim 1, said strap further comprising one or more rails configured to run from approximately said first strap end to said second strap end.

3. The cable tie of claim 2, wherein said one or more rails and said channel are configured to accommodate passage therethrough of said strap.

4. The cable tie of claim 1, wherein said plurality of cross-bars are positioned crosswise on said strap.

5. The cable tie of claim 1, wherein said plurality of cross-bars are positioned parallel to one another on said strap.

6. The cable tie of claim 1, wherein said tongue hinged to said second strap end is configured to accommodate said two ratchetable pawls positioned side-by-side thereon.

7. The cable tie of claim 6, wherein one cross-bar of said plurality of cross-bars configured in two parallel spaced rows further comprises a pawl riser and a pawl catch.

8. The cable tie of claim 6, further comprising a lever configured to pivot said tongue and said two ratchetable pawls positioned side-by-side to release said strap from said locking buckle.

9. The cable tie of claim 1, wherein said first strap end is configured to insert therethrough said channel of said locking buckle.

10. The cable tie of claim 1, wherein said first strap end is configured to encircle the one or more elongated members.

11. The cable tie of claim 1, wherein said first strap end is inserted through said channel of said locking buckle.

12. The cable tie of claim 1, wherein said pawls are configured to engage said plurality of cross-bars configured in two parallel spaced rows of said strap to secure the one or more elongated members.

13. The cable tie of claim 12, further comprising an attachment device configured to affix said strap and the elongated members to the object.

14. The cable tie of claim 1, wherein each cross-bar of said plurality of cross-bars configured in two parallel spaced rows further comprises a pawl riser and a pawl catch.

15. The cable tie of claim 1 further comprising a transition support between said locking buckle and said second strap end of said strap configured to reduce a flex or bend between said locking buckle and said second strap end of said strap, to maintain said locking buckle and said second strap end of said strap at a fixed position or angle therebetween, and/or to stabilize said locking buckle when pulling said strap therethrough said locking buckle.

16. The cable tie of claim 1 wherein said locking buckle includes a hinge positioned proximate said second strap end or in said channel of said locking buckle providing hinge movement, spring torsion, rotational flexibility, or ratchet movement as radial movement for said tongue.

17. A method of bundling one or more elongated members to a hole in an object comprising the steps of:
   providing a cable tie comprising a strap configured with a first strap end and a second strap end and a top side and an underside, said strap configured with a plurality of cross-bars extended in two parallel spaced rows along each of said top side and said underside of said strap, said strap configured with one or more longitudinally spaced apertures therethrough, wherein said one or more longitudinally spaced apertures are positioned between said two parallel rows of said plurality of cross-bars, a locking buckle positioned proximate said second strap end, said locking buckle is further configured to be approximately perpendicular to said second strap end, said locking buckle configured with a channel therethrough, wherein said channel is formed approximately parallel to said second strap end, said channel configured with two stationary pawls positioned therein to confront individually associated pairs of said plurality of cross-bars extended in two parallel spaced rows along said top side of said strap, and a tongue hingedly extended from said second strap end, said tongue configured with two ratchetable pawls facing said channel, said two ratchetable pawls to confront individually associated pairs of said plurality of cross-bars extended in two parallel spaced rows along said underside;
   encircling the one or more elongated members with said first strap end around;
   inserting said first strap end therein said channel of said locking buckle;
   pulling said first strap end through said channel; and
   ratcheting said plurality of cross-bars configured in two parallel spaced rows formed on said strap across said pawls to secure the elongated members together in a bundle.

18. The method of claim 17, further comprising the step of aligning said one or more longitudinally spaced apertures of said strap proximate the hole in the object.

19. The method of claim 18, further comprising the step of inserting an attachment device through said one or more longitudinally spaced apertures of said strap.

20. The method of claim 19, further comprising the step of affixing said attachment device to the hole in the object.

21. The method of claim 20, further comprising the step of utilizing two or more said cable tie to secure a run of the one or more elongated members to the object.

22. The method of claim 17 wherein the provided cable tie further comprising a transition support between said locking buckle and said second strap end of said strap configured to reduce a flex or bend between said locking buckle and said second strap end of said strap, to maintain said locking buckle and said second strap end of said strap at a fixed position or angle therebetween, and/or to stabilize said locking buckle when pulling said strap therethrough said locking buckle.

23. The method of claim 17 wherein said locking buckle includes a hinge positioned proximate said second strap end or in said channel of said locking buckle providing hinge movement, spring torsion, rotational flexibility, or ratchet movement as radial movement for said tongue.

* * * * *